(12) United States Patent
Dorosko et al.

(10) Patent No.: US 8,763,944 B2
(45) Date of Patent: Jul. 1, 2014

(54) SLIP HUB TAKE-UP REEL WITHOUT SLIP RING

(75) Inventors: Robert K. Dorosko, Wilmington, NC (US); Colin F. Kelemen, Wilmington, NC (US)

(73) Assignee: GE-Hitachi Nuclear Energy Americas, LLC, Wilmington, NC (US)

( * ) Notice: Subject to any disclaimer, the term of this patent is extended or adjusted under 35 U.S.C. 154(b) by 433 days.

(21) Appl. No.: 13/276,453

(22) Filed: Oct. 19, 2011

(65) Prior Publication Data

US 2013/0099042 A1 Apr. 25, 2013

(51) Int. Cl.
*B65H 75/44* (2006.01)

(52) U.S. Cl.
USPC ..... 242/388.5; 242/376; 242/377; 242/378.2; 242/390; 242/395; 242/397.3; 242/397.4; 242/407

(58) Field of Classification Search
CPC .. B65H 75/4407; B65H 75/441; B65H 75/48; B65H 75/4486; B65H 75/4492; B65H 75/4494; B65H 75/368; B65H 75/4449

USPC ............ 242/378, 378.1, 378.2, 378.3, 388.5, 242/388.6, 588, 600, 602, 602.1, 602.2, 242/376, 377, 389, 390, 395, 397, 242/397.2–397.4, 407

See application file for complete search history.

(56) References Cited

U.S. PATENT DOCUMENTS 1,850,677 A * 3/1932 Kieneman .................. 242/388.1
2,206,352 A * 7/1940 Hellmann .................. 242/378.2

* cited by examiner

*Primary Examiner* — William E Dondero
(74) *Attorney, Agent, or Firm* — Harness, Dickey & Pierce, PLC

(57) ABSTRACT

A take-up spool may include a first plurality of rollers arranged in a left handed helical pattern, a second plurality of rollers below the first plurality of rollers and arranged in a right handed helical pattern, a third plurality of rollers arranged in an S-shaped pattern, the third plurality of rollers being arranged between the first and second plurality of rollers, a guide configured to move vertically, the guide being arranged at a first side of the first plurality of rollers, and a clamp configured to move vertically, the clamp being arranged at a second side of the first plurality of rollers.

20 Claims, 5 Drawing Sheets

SLIP HUB TAKE-UP REEL WITHOUT SLIP RING

BACKGROUND

1. Field

Example embodiments relate to a take-up reel for efficiently storing and supplying a cable.

2. Description of Related Art

Conventional take-up reels include a cylinder upon which a cable may be wrapped and unwrapped. In operation, a cable may be unwrapped or wrapped from the cylinder as the cylinder is rotated.

In conventional take-up reels designed to load and unload electrical cable, slip rings are employed for the purpose of making an electrical connection. A conventional slip ring includes a conductive circle or band mounted on a shaft and insulated from it. Electrical connections from the rotating part of the system (for example, the cylinder), are made to the ring and fixed contacts or brushes run in contact with the ring, transferring electrical power or signals to the exterior, static part of the system. In some conventional take-up reels, however, the slip ring assembly may cause problems due to electrical noise and degradation of a signal may be produced by the rubbing contacts of the slip rings. Furthermore, slip-rings are prone to failure due to fatigue.

In other conventional take-up reels, various cables, for example, pneumatic, fiber optic, or hydraulic cables, may be wrapped around a reel for storage purposes. The cable, when dispensed, is prone to twisting which may make dispensing the cable difficult or may result in damage to the cable.

SUMMARY

Example embodiments are related to a take-up reel for efficiently storing, taking up, and supplying a cable. In particular, example embodiments are directed to a take-up reel for efficiently storing, taking up, and supplying electrical cable.

In accordance with example embodiments, a take-up reel may include a first plurality of supporting members arranged in a left handed helical pattern, a second plurality of supporting members below the first plurality of supporting members and arranged in a right handed helical pattern, and a third plurality of supporting members arranged in an S-shaped pattern, the third plurality of supporting members being arranged between the first and second plurality of supporting members.

In accordance with an example embodiment, a system may include a cable and a take-up spool supporting the cable. In example embodiments, the take-up spool may include a first plurality of rollers arranged in a left handed helical pattern, a second plurality of rollers below the first plurality of rollers and arranged in a right handed helical pattern, a third plurality of rollers arranged in an S-shaped pattern, the third plurality of rollers being arranged between the first and second plurality of rollers, a guide configured to move vertically, the guide being arranged at a first side of the first plurality of rollers, and a clamp configured to move vertically, the clamp being arranged at a second side of the first plurality of rollers.

BRIEF DESCRIPTION OF THE DRAWINGS

The various features and advantages of non-limiting example embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION

Figure 1:
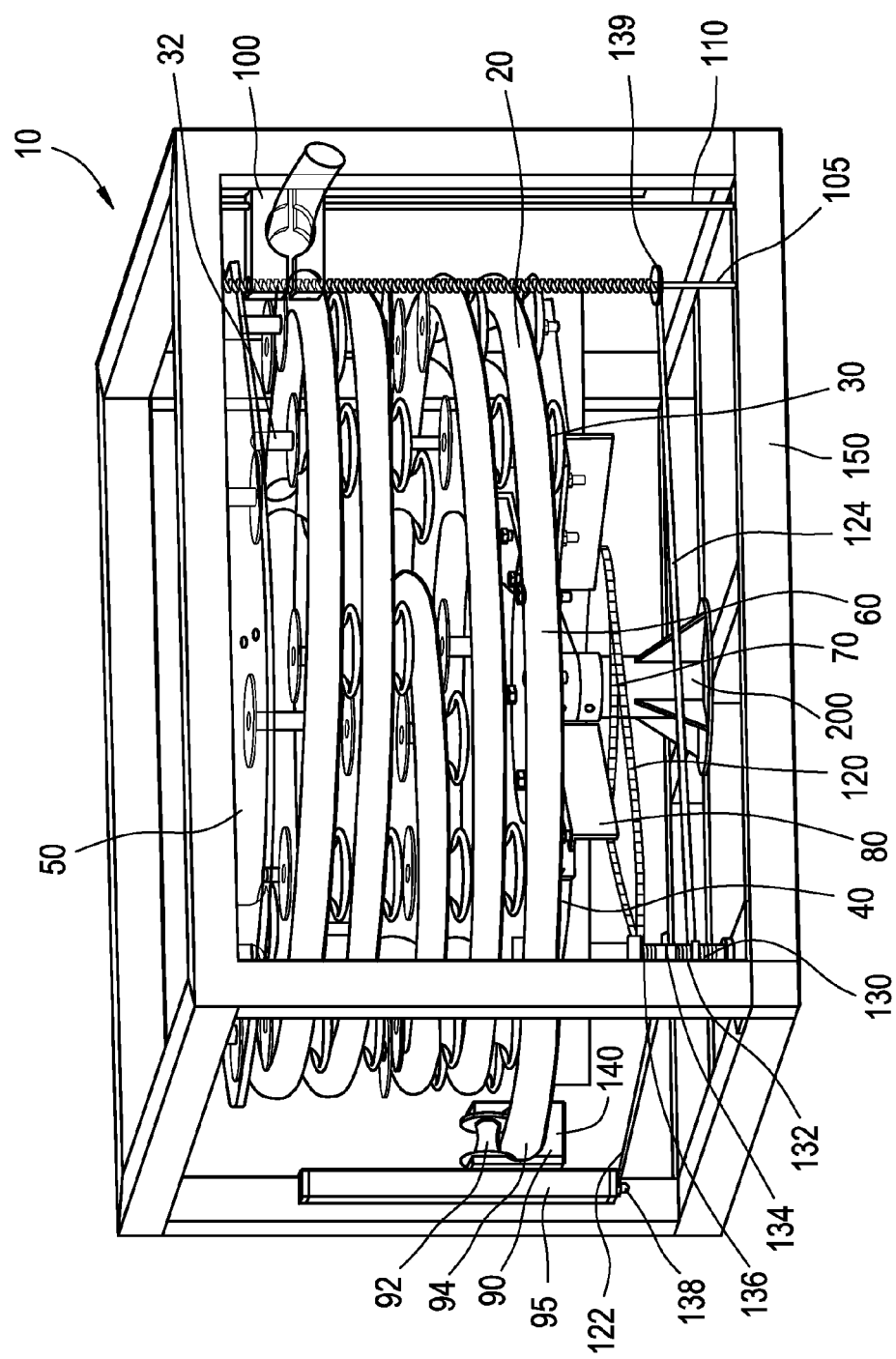
FIG. 1 is a perspective view of a take-up reel according to example embodiments.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

FIG. 1 is a perspective view of a take-up reel 10 according to example embodiments. As shown in FIG. 1, the take up reel 10 includes a plurality of rollers 30 (an example of a supporting member) around which a cable 20 is wrapped. One end of the cable 20 may be fixed by a clamp 100 (an example of an anchor), whereas another end of the cable may be free to slide through a guide 90. In example embodiments, the cable 20 may include a signal line for collecting data, for example, feedback of motors. In addition, the cable 20 may be a pneumatic, fiber optic, or hydraulic cable. Although example embodiments utilize rollers 30 as a supporting member, the invention is not limited thereto. For example, rather than utilizing rollers 30, example embodiments could use slick helical channels.

Figure 5:
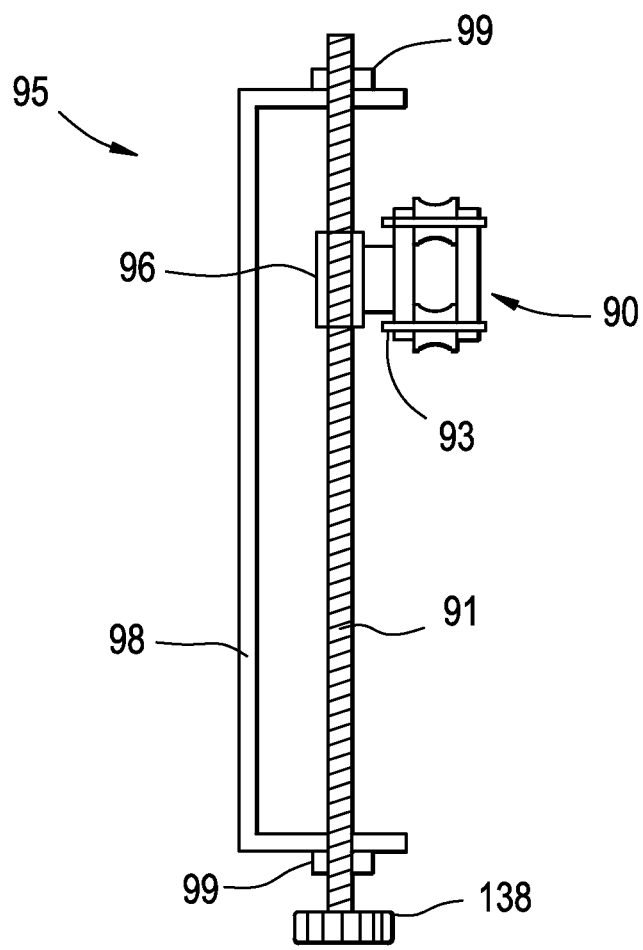
FIG. 5 is a cross-section of a linear slide and a guide member according to example embodiments.

In example embodiments, the guide 90 may include a guide box supporting a couple of rollers 92 and 94. FIG. 5 is a cross-section of a linear slide 95 associated with the guide 90. As shown in FIGS. 1 and 5, the rollers 92 and 94 may be configured to contact the cable 20 and may be further configured to rotate so that the cable 20 passes easily through the guide 90 without binding or generating resistance due to friction. The rollers 92 and 94, for example, may be supported by shafts 93 which in turn are supported by the guide box. In addition, the rollers 92 and 94 may include bearings so that the rollers 92 and 94 may rotate freely. The guide 90 may be connected to the linear slide 95 via a coupling member 96. The linear slide 95 may include a threaded member 91 (for example a threaded rod) engaging the coupling member 96 so that as the threaded member rotates, the guide box with the rollers 92 and 94 may move vertically. In example embodiments, the coupling member 96 may resemble a cylinder having internal threads configured to engage external threads of the threaded member 91.

The threaded member 91 of the guide 90 may include a sprocket 138 engaging a belt 122 which in turn is engaged with a first sprocket 134 of a shaft 130 of a motor 140. Thus, as the motor 140 operates, the shaft 130 rotates which in turn drives the belt 122 to rotate the sprocket 138. As the sprocket 138 rotates, the threaded member 91 rotates and the guide 90 moves up and down, depending on the direction of rotation of the threaded member 91.

In Example embodiments, a shell 96 may substantially surround the threaded member 91 and may serve as a connection structure to connect the guide 90 and the threaded member 91 to a frame. In example embodiments, the threaded member 91 may be secured to a top portion and a bottom portion of the shell 96 by bolts 99. Although FIGS. 1 and 5 provide an example embodiment of a linear slide/guide arrangement, example embodiments are not limited to having this particular linear slide/guide arrangement.

As discussed previously, the clamp 100 may fix one end of the cable 20. The clamp 100, like the guide 90, may be configured to move vertically in response to an operation of the motor 140. For example, the clamp 100 may be connected to a threaded member 105 which includes a sprocket 139. One side of the clamp 100 may include a hole passing therethrough and the hole may include a threaded surface that engages threads of the threaded member 105. A second side of the clamp 100 may include a hole through which a guide member 110 passes. The guide member 110, for example, may be a rod. The sprocket 139 may be connected to a belt 124 which is connected to second sprocket 132 of the shaft 130 of the motor 140. Thus, as the shaft 130 of the motor 140 rotates, the belt 124 is driven to rotate the threaded member 105 which in turn moves the clamp 100 up and down vertically depending on the direction the shaft 130 rotates.

In example embodiments, the reel shafts 32 may extend from the upper plate 50 (an example of an upper support structure) to the lower plate 40 (an example of a lower support structure) and the reel shafts 32 may penetrate thru-holes in both the upper and lower plates 50 and 40. Example embodiments, however, are not limited thereto and may in turn be cantilevered from one or both of the upper and lower plates 50 and 40. Furthermore, rather than using plates to support the reel shafts 32, a ring and spoke structure could be constructed to support the reel shafts 32.

As shown in FIG. 1, the cable 20 may be housed between an upper plate 50 and a lower plate 40. In example embodiments, the upper plate 50 and the lower plate 40 may be circular, however, example embodiments are not limited thereto. For example, the upper and lower plates 50 and 40 may be polygonal shaped, for example, hexagonal or octagonal. The lower plate 40 and the upper plate 50 may include a plurality of thru-holes through which reel shafts 32 may be inserted. The tops and bottoms of the reel shafts 32 may be threaded allowing them to be bolted to the upper and lower plates 50 and 40 via bolts 34 (see FIG. 4). In another example embodiment, the reel shafts 32 may include a shoulder facing inside surfaces of the upper and lower plates 50 and 40. Thus, the upper and lower plates 50 and 40 may alternatively be clamped via the shoulders of the reel shafts 32 and the bolts 34.

The lower plate 40 may include a plurality of stiffeners 80 arranged underneath a bottom surface of the lower plate 40. For example, the stiffeners 80 may be comprised of angle iron that may be bolted to the lower plate 40. The lower plate 40 may also be connected to a rotatable shaft enclosed by housing member 200. The rotatable shaft may include a sprocket 70 connected to a belt 120. The belt 120 may in turn be connected to a third sprocket 136 of the shaft 130. Thus, as the motor 140 operates, the shaft 130 rotates thus causing the belt 120 to drive the sprocket 70 to rotate causing the upper and lower plates 50 and 40, and all components residing therein, to rotate. Although example embodiments illustrate a motor 140 for driving a shaft 130, the invention is not limited thereto. For example, rather than using a motor 140, to drive the shaft 130, a hand crank or a spring mechanism could be used instead. Thus, 140 illustrated in FIG. 4 could represent a hand crank or a spring mechanism.

As is evident from the above discussion, a single motor 140 with a single shaft 130 may be used to move a guide 90, a clamp 100, and a reel assembly (upper and lower plates 50 and 40 and all components residing therein) simultaneously. Furthermore, the motion of each of these components may be carefully synchronized so that the cable 20 may be pulled efficiently from the take-up reel 10. In addition, the threaded member of the guide 90 may include right-handed threads whereas the threaded member of the clamp 100 may include left-handed threads. Thus, as the shaft 130 of the motor 140 rotates, the guide 90 may be moved upwards while the clamp 100 is moved downwards, or, in the alternative, as the shaft 130 of the motor 140 rotates, the guide 90 may be moved downwards while the clamp 100 is moved upwards. In example embodiments, the guide 90, the clamp 100, and the reel assembly (upper and lower plates 50 and 40 and all components residing therein) may be fully synchronized via sprocket sizing and the careful selection of thread pitch. In addition, the belts 120, 122, and 124 may be timing belts or chains to prevent or reduce slippage between the belts and the sprockets.

Figure 2:
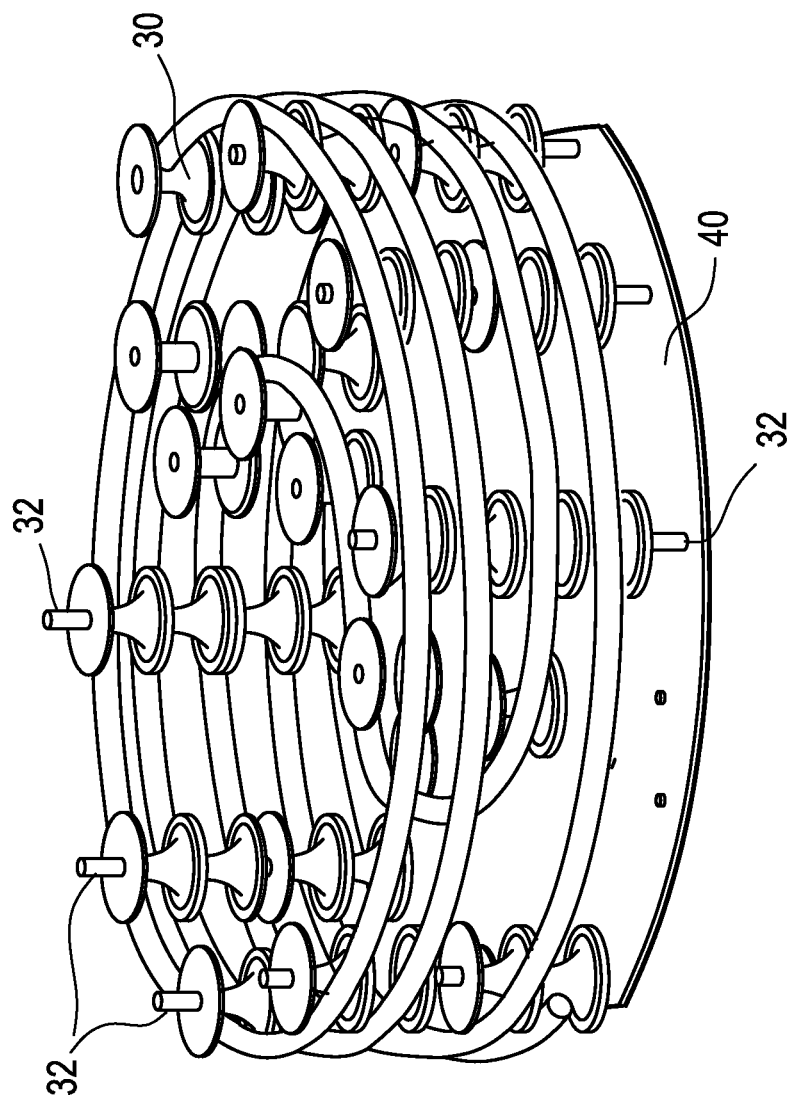
FIG. 2 a perspective view of a plurality of rollers and a cable according to example embodiments.
Figure 3:
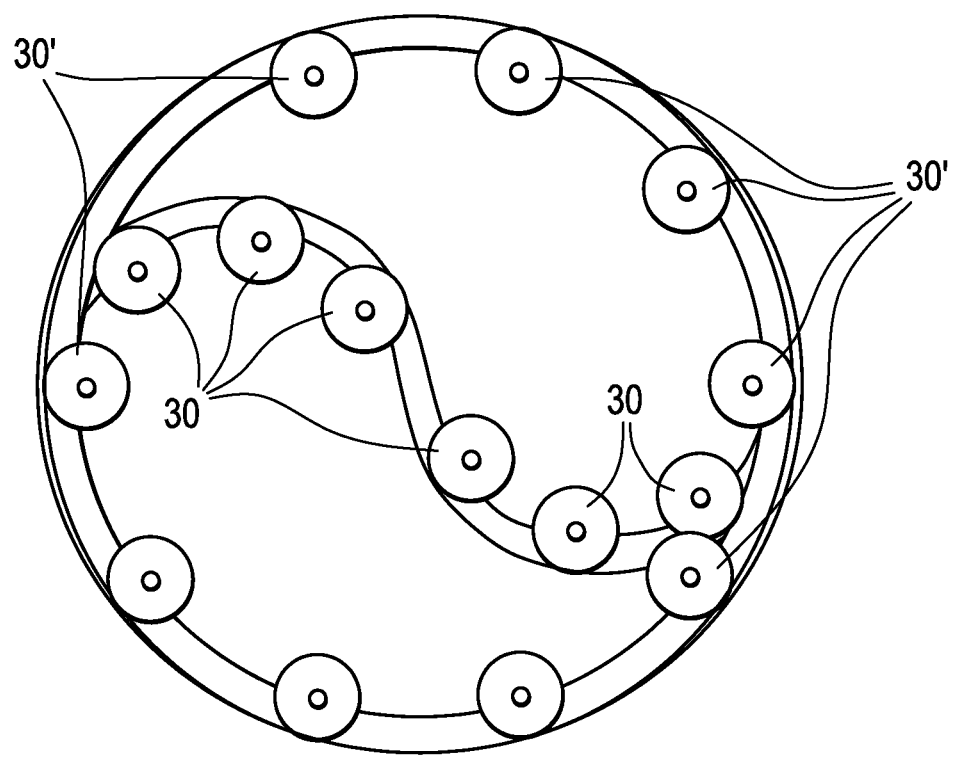
FIG. 3 is a plan view of a plurality of rollers and a cable according to example embodiments.

FIG. 2 is a perspective view of the rollers 30 and the reel shafts 32 with the cable 20 threaded therethrough. FIG. 3 is a plan view of the rollers 30, the reel shafts 32, and the cable 20. With regard to the arrangement of the rollers 30 and the cable 20, FIGS. 2 and 3 show that the rollers 30 may be arranged as a first plurality of rollers 30' arranged in a circular pattern along an outside of the take-up reel 10 and a second plurality of rollers 30" arranged in an S-shape crossing the first plurality of rollers 30'. The arrangement of the second plurality of rollers 30" allows a wrapping of the cable 20 to change from a clockwise wrapping to a counter-clockwise wrapping thus allowing for more cable to be taken up by the reel per revolution of the sprocket 70.

In example embodiments, the elevation of each roller 30 is offset so as to imitate a natural wrap of the cable 20 onto the rollers 30. For example, the first plurality of rollers 30' may be arranged in a circular pattern and may include an upper plurality of rollers and a lower plurality of rollers. The upper plurality of rollers may be arranged in a helical pattern and the lower plurality of rollers may likewise be arranged in a helical pattern. In example embodiments, the helical pattern of the upper plurality of rollers should be opposite to the helical pattern formed by the lower plurality of rollers. For example, the upper plurality of rollers may have a right-handed wrap and the lower plurality of rollers may have a left-handed wrap. In addition, the second plurality of rollers 30" should be arranged between the upper plurality of rollers and the lower plurality of rollers. Furthermore, the drive ratios of the roller threaded members of the guide 90 and the clamp 100 are set such that the cable 20 falls into a center of each roller 30 as the cable 20 passes into and out of the take-up reel 10.

As is evident from FIG. 2, the upper and lower pluralities of rollers may be formed one on top of another. Thus, a first roller in an upper plurality of roller may be placed directly over a second roller in the lower plurality of rollers. In example embodiments, the just described first and second roller may be formed as two independent rollers each being able to rotate independently of each other. However, in the plurality of rollers arranged in an S-pattern (30"), there may be no corresponding lower or upper roller directly above or below the plurality of rollers 30". The rollers may include several grooves (for example, three) machined in thems such that the cable can make several passes (for example, three) across each roller. Thus, the grooves in each roller may act as one unit.

As shown in FIGS. 1-4, the take-up reel 10 includes a frame 150. The frame 150 may be constructed from tube steel, however, example embodiments are not limited thereto. The frame 150 may protect the take-up reel 150 from damage and may also serve as a structural support for the take-up reel. For example, the guide 90 and the linear slide 95 may be supported by the frame 150 as shown in FIG. 1. Furthermore, the motor 140 as well as the threaded member 105 and guide 110 may also be connected to the frame 150 as shown in FIG. 1. Furthermore, the frame may include a flooring upon which the housing 200 of the rotatable shaft is connected.

Figure 4:
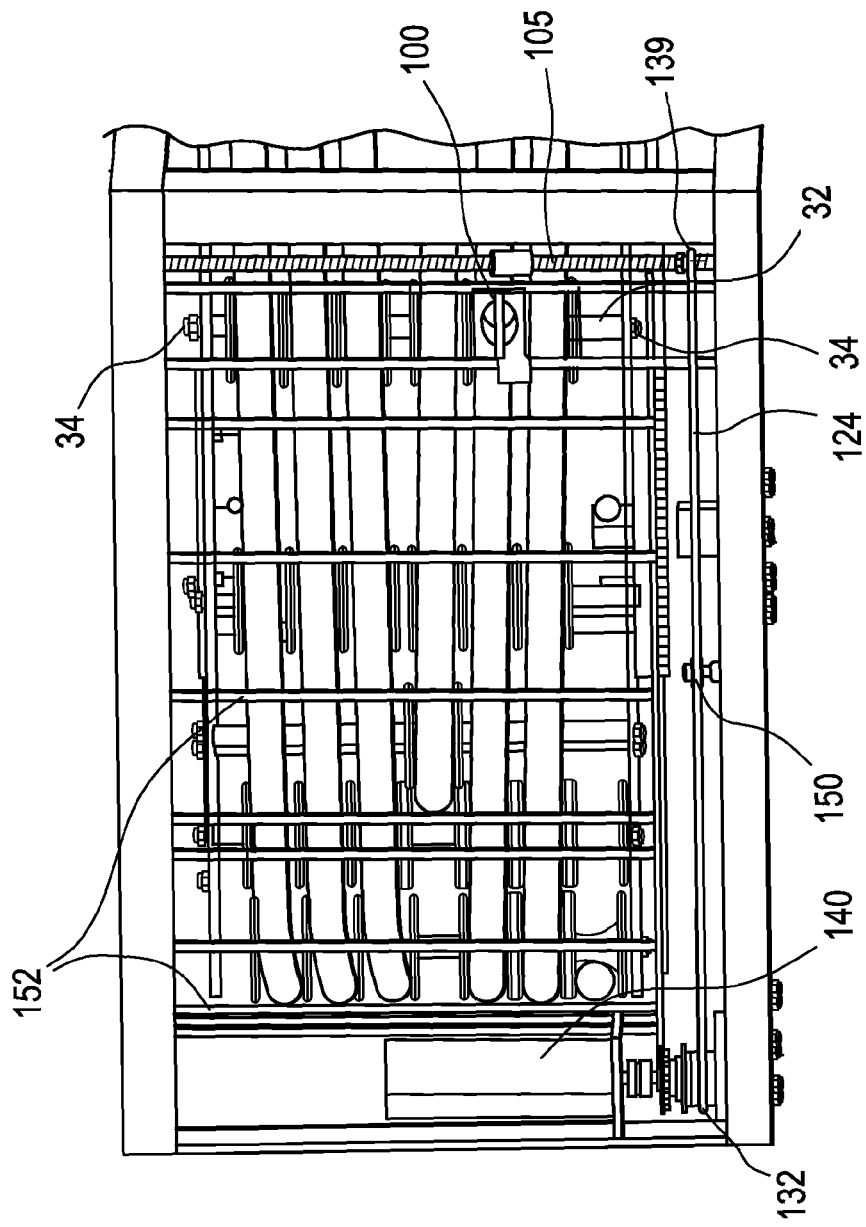
FIG. 4. is another perspective view of a take-up reel according to example embodiments.

In addition to the above features, the take-up reel 10 may also include cable guards 152 as shown in FIG. 4. The cable guards 152 may resemble a plurality of rods arrayed around a circumference of the take-up reel and may keep the cable 20 on the rollers 30 in the event tension of the cable 20 is lost.

The take-up reel of example embodiments may be utilized to wrap, store, and dispense various types of cables and thus may be utilized in various applications. For example the take-up reel may be utilized to store relatively large diameter electrical, pneumatic, or hydraulic cable. However, example embodiments are not limited thereto. For example, in the medical field, surgeons utilize lasers resembling tiny pens to perform various operations. The lasers are often coupled to a fiber optic cable to feed the laser. Such a cable may be stored and dispensed using the take-up reel of example embodiments.

While example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims.

The invention claimed is:

1. A take-up reel comprising:
a first plurality of supporting members arranged in a left handed helical pattern;
a second plurality of supporting members below the first plurality of supporting members and arranged in a right handed helical pattern; and
a third plurality of supporting members arranged in an S-shaped pattern, the third plurality of supporting members being arranged between the first and second plurality of supporting members.

2. The take-up reel according to claim 1, further comprising:
a guide configured to move vertically, the guide being arranged at a first side of the first plurality of supporting members; and
an anchor configured to move vertically, the anchor being arranged at a second side of the first plurality of supporting members.

3. The take-up reel according to claim 2, further comprising:
an upper support structure above the first plurality of supporting members;
a lower support structure below the second plurality of supporting members;
a rotatable shaft connected to a bottom of the lower support structure; and
a plurality of reel shafts connected to the upper and lower support structures, the plurality of reel shafts penetrating the first, second, and third pluralities of supporting members.

4. The take-up reel according to claim 3, wherein the upper and lower support structures are plates.

5. The take-up reel according to claim 3, further comprising:
a first threaded member connected to the guide;
a second threaded member connected to the anchor; and a drive shaft operatively connected to the first threaded member, the second threaded member, and the rotatable shaft.

6. The take-up reel according to claim 5, further comprising:
a first belt connecting the first threaded member to the drive shaft;
a second belt connecting the second threaded member to the drive shaft; and
a third belt connecting the rotatable shaft to the drive shaft.

7. The take-up reel according to claim 6, wherein
the drive shaft includes a first sprocket, a second sprocket, and a third sprocket,
the first threaded member includes a fourth sprocket,
the second threaded member includes a fifth sprocket,
the rotatable shaft includes a sixth sprocket, and
the first belt is connected to the first sprocket and the fourth sprocket, the second belt is connected to the second sprocket and the fifth sprocket, and the third belt is connected to the sixth sprocket and the third sprocket.

8. The take-up reel according to claim 6, further comprising:
one of a motor, a hand crank, and a spring mechanism to drive the drive shaft.

9. The take-up reel according to claim 5, wherein the first guide is configured to move upwards when the anchor moves downwards.

10. The take-up reel according to claim 9, wherein the first threaded member includes one of left handed threads and right handed threads and the second threaded member the other of the left handed threads and the right handed threads.

11. The take-up reel according to claim 3, wherein the upper and lower support structures include a ring and spokes.

12. The take-up reel according to claim 2, wherein the anchor is a clamp.

13. The take-up reel according to claim 1, wherein the first, second, and third pluralities of supporting members are rollers.

14. The take-up reel according to claim 13, wherein the first plurality of rollers, the second plurality of rollers, and the third plurality of rollers include bearings.

15. The take-up reel according to claim 13, wherein the third plurality of rollers is configured to change a direction of cable wrap from right handed to left handed.

16. The take-up reel according to claim 15, wherein the third plurality of rollers is arranged at mid height with respect to the first plurality of rollers and the second plurality of rollers.

17. The take-up reel according to claim 1, wherein the each of the rollers in the first, second, and third plurality of rollers has flat top and bottom portions and a tapered middle portion.

18. The take-up reel according to claim 1, wherein the guide includes a first roller and a second roller configured to guide a cable.

19. The take-up reel according to claim 1, wherein the supporting members are configured to support a cable, the guide is configured to guide the cable, and the anchor is configured to clamp the cable.

20. The take-up reel according to claim 1, wherein the first, second, and third pluralities of supporting members are driven by a driving mechanism.

* * * * *